Figure 1:
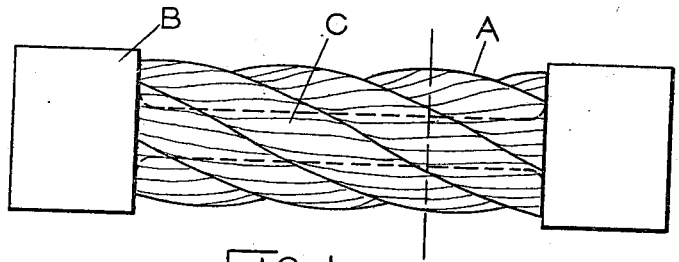

No. 662,071.  
Patented Nov. 20, 1900.

G. R. JOUGHINS.
STAY BOLT.
(Application filed June 18, 1900.)

(No Model.)

WITNESSES:
James Treat-Dustan
William Earle Barnes

George Robert Joughins, INVENTOR

UNITED STATES PATENT OFFICE.

GEORGE ROBERT JOUGHINS, OF MONCTON, CANADA.

STAY-BOLT.

SPECIFICATION forming part of Letters Patent No. 662,071, dated November 20, 1900.

Application filed June 18, 1900. Serial No. 20,696. (No model.)

*To all whom it may concern:*

Be it known that I, GEORGE ROBERT JOUGHINS, residing at Moncton, Province of New Brunswick, Canada, have invented a new and useful Improvement in Stay-Bolts, of which the following is a specification.

My invention relates to what are known as "stay-bolts" or "screw stay-bolts," which are generally used in boilers to stay the flat surfaces thereof and so enable them to sustain the boiler-pressure bearing upon them. Such bolts are the only practicable means at present known for sustaining large flat surfaces, such as the sides of fire-boxes of locomotives and the flat parts of other boilers. The stay-bolts at present in use are not satisfactory, as they frequently break because of the repeated bendings in opposite directions to which they are subjected, bendings due to the differing temperatures in the fire-box, which cause it to slightly alter its shape.

My invention is intended to materially increase the durability of such bolts by making them partially flexible, and thereby enabling them to be bent to a comparatively large degree to and fro without injury. To obtain such flexibility combined with the strength necessary, I propose to make a bolt of numerous pieces of metal assembled together, so as to form approximately a wire rope, and which would tie the two flat surfaces together.

It seems apparent that if a piece of wire rope could be used to stay flat surfaces together it would have all the strength and flexibility desired, and would therefore probably be an ideal stay-bolt, so far as those two points are concerned; but it has appeared impossible to apply it to such a purpose, as no one has suggested a means of making a wire rope steam-tight in the screwed holes of the plates composing the flat surfaces, which it must necessarily be, nor has any one suggested a means of threading such a piece of rope or pointed out how it can be applied to the sheets of a boiler, all of which operations are absolutely necessary and essential to make up a practicable and useful bolt.

My invention furnishes the means for accomplishing the above objects, and thus makes it possible to use a stay-bolt made up of numerous strands or pieces laid side by side lengthwise of the bolt. It is evident that the pieces may be of any suitable section, round or square or any other form, and of such a size as to give the necessary flexibility. They may be plaited together into the form of a rope or be laid parallel or in any other shape, so as to produce a bolt having the pieces or strands extending to or through the plates or to the pieces which are screwed into the plates, which are to be stayed together.

To make such a bolt steam-tight in the plates, I would form a solid knob upon it on each end, so that its form would be fairly described by saying that it is a bolt made up of a central portion consisting of several strands laid together, which are attached to a solid knob or cylindrically-shaped piece at each end. The ends can be made solid in various ways, such as by placing a metal ferrule on each end and welding it to the strands or attaching it by any other suitable means, such as by electrolysis or by welding suitable pieces upon the ends of the strands either before or after being applied to the plates, said ends being fastened into the sheets by the usual or any other suitable method. In this way I produce a bolt which is as flexible as may be desired, depending upon the shape and area of the section of the strands composing the body of the bolt and yet is completely solid where it passes through or is attached to the plates.

Referring to the threading and application of such a bolt, it is evident that such a flexible bolt as described above could not have its ends threaded accurately in exact and proper relation to each other, nor could it be screwed simultaneously into the two sheets, as is necessary. To enable this to be done, I make the body of the bolt partially solid, so that there may be a sufficiently substantial connection between the two ends. I make, as it were, a backbone to the bolt. This can be accomplished in various ways, such as by making at least one of the strands of sufficiently large section and rigidity to withstand the torsional and bending strains to which the stay-bolt may be subjected in manufacture and application, and thus enable the two ends to retain an exact relative position to each other just the same as the threads on the taps which tapped the holes in the sheets, or it may be accomplished by partly solidifying the body of the bolt by electric agency, welding, or electrolysis, or it may be done in other ways.

Having generally described my invention, I would further illustrate my idea by describing one method of making up a bolt according to my invention.

To make a bolt of, say, one inch in diameter, I would take a piece of three-eighths-inch round iron of a suitable length, place upon it at each end a ferrule, and around both iron and ferrules a bundle of wires, each about one-eighth of an inch in diameter, then over the wires at each end another ferrule, and then weld together the parts composing each end, thus forming a solid knob, which would then be machined down to the proper size and threaded. Another way would be to have a rope or strands made up with a large core of metal. Then by cutting off pieces of suitable length and electrically welding them onto suitable pieces of metal, either before or after application to the plates, we quickly produce a practicable stay-bolt.

Figure 2:
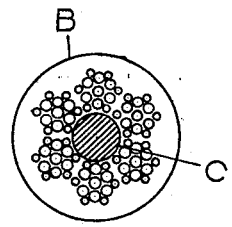
Figure 3:
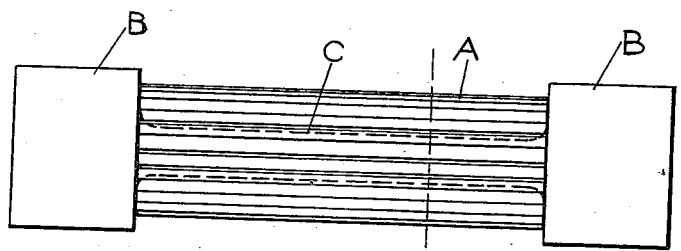
Figure 4:
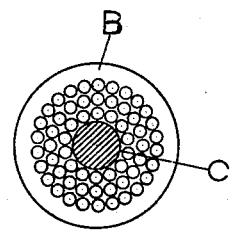

In the accompanying drawings of the stay-bolts, Figures 1 and 2 show a bolt made up with the body consisting substantially of a piece of wire rope, and Figs. 3 and 4 with a body made up of parallel wires. Figs. 2 and 4 are sections through the middle of the bolt.

A represents the strands or wires, B the ends attached thereto, and C the solid portion or backbone connecting the two ends.

I am aware that some one has suggested the making of a stay-bolt in four longitudinal pieces, each piece the shape of a quarter-section of a circle, and I do not intend my claim to cover such a construction.

What I claim as my invention, and desire to secure by Letters Patent, is—

1. A stay-bolt made up of numerous pieces of metal forming substantially a rope, and with ends attached which form a steam-tight joint in the plates to be stayed, in combination with the stayed surfaces of a boiler, substantially as described.

2. A stay-bolt made up of numerous pieces of metal, laid or plaited together, and having ends solidified, in combination with the stayed surfaces of a boiler, substantially as described.

3. A stay-bolt made up of numerous pieces of metal laid or plaited together substantially longitudinally with the body of the bolt, and having enlarged solid ends attached to form a suitable steam-tight connection with the plates to be stayed, in combination with the stayed surfaces of a boiler, substantially as described.

4. A stay-bolt having the body formed of numerous wires, and with solid ends attached thereto, in combination with the stayed surfaces of a boiler, substantially as described.

5. A stay-bolt made up of numerous strands of metal, having ends forming steam-tight joints in the plates which it supports, and with a backbone or solid section attaching both ends sufficiently large to transmit the strains necessary in manufacturing and applying the bolt, substantially as described.

6. A stay-bolt comprising two solid ends, a rigid connection between them to resist the torsional and bending strains to which stay-bolts are subjected in manufacture and application, and numerous pieces or strands attached to said ends, connecting or tying them together to resist the working strains, substantially as described.

GEORGE ROBERT JOUGHINS.

Witnesses:
RICHARD LUTTRELL ERMON,
JOHN HAYES GELDART.